United States Patent Office 3,532,835

Patented Oct. 6, 1970

3,532,835

SIGNAL RESPONSIVE CONTROL DEVICE FOR DISCONNECTING A REPRODUCER FOR PREDETERMINED TIME PERIODS

Takeshi Nakayama and Tanetoshi Miura, Tokyo, Tsuneji Koshikswa, Tokorozawa-shi, and Yasuaki Nakano, Hino-shi, Tokyo, Japan, assignors to Hitachi, Ltd., Tokyo-to, Japan Filed Sept. 28, 1967, Ser. No. 671,370

Claims priority, application Japan, Sept. 28, 1966, 41/63,455; Dec. 16, 1966, 41/82,088; June 7, 1967, 42/35,950

Int. Cl. G11b 27/22

U.S. Cl. 179—100.1 29 Claims

ABSTRACT OF THE DISCLOSURE

Apparatus for controlling a signal reproducer, such as a magnetic recorded tape player or the like, operatingly reproducing a sequence of signals of varying duration including a detector for detecting the generated signals, a timing arrangement for determining and storing the time period of each continuous signal derived from the signal reproducer and control means for disconnecting the signal reproducer from its power supply for the extent of the time period determined by the timing arrangement under control of the detector.

This invention relates in general to an operation controller for signal reproducers, such as magnetic recorded tape players or the like, and more particularly to a signal reproduction control device for intermittently halting the operation of such a signal reproducer to provide periodic intermission in the signal reproduction.

It has become common practice to record the contents of speech, lecture, conversation, discussion, etc., by means of a signal reproducer, such as a magnetic tape player. There is, however, a difference between speeds of speaking and writing; therefore, it is required to interrupt the operation of a signal reproducer intermittently during the transcribing operation to compensate for this disparagy. Conventionally, such intermittent operation is performed by manually operable switches, such as a foot switch or hand switch, but such manual control is generally quite troublesome for operators. There has been provided an automatic control device by which a signal reproducer is intermittently halted in its operation for a predetermined period of time in response to pauses included in the reproduced signal. This device is, however, less than satisfactory since the delay period is necessarily constant, with the result that it is often too short or too long for standard transcription.

One of the objects of the present invention is, therefore, to provide an improved control device which eliminates or substantially reduces the abovedescribed difficulties and disadvantages inherent in conventional arrangements.

Another object of the present invention is to provide an improved control device which intermittently halts signal reproducers for adequately determined periods of time which are varied in proportion to the length of the previous signal period.

A further object of the present invention is to provide an improved control device for a signal reproducer which operatingly halts the signal reproducer in response to pauses included in the reproduced signal, the length of the halting period performed by the control device being dependent upon the one continuous period of the reproduced signal prior to the one pause by which halting is commenced.

The control device according to the present invention is characterized in that it comprises detecting means for detecting the commencements and terminations of respective continuations of the reproduced signal, means for counting the length of the signal period of each one continuation of the reproduced signal, and means for halting a signal reproducer in response to the detection of the termination of the reproduced signal by the detecting means for a period of time the length of which is monotonically varied in proportion to the length of the signal period of one continuation of the reproduced signal counted by the counting means.

The abovedescribed and other objects, features and advantages of the present invention will be well understood from the following description when taken in connection with the accompanying drawings which illustrate, by way of example, certain preferred embodiments of the present invention.

Figure 1:
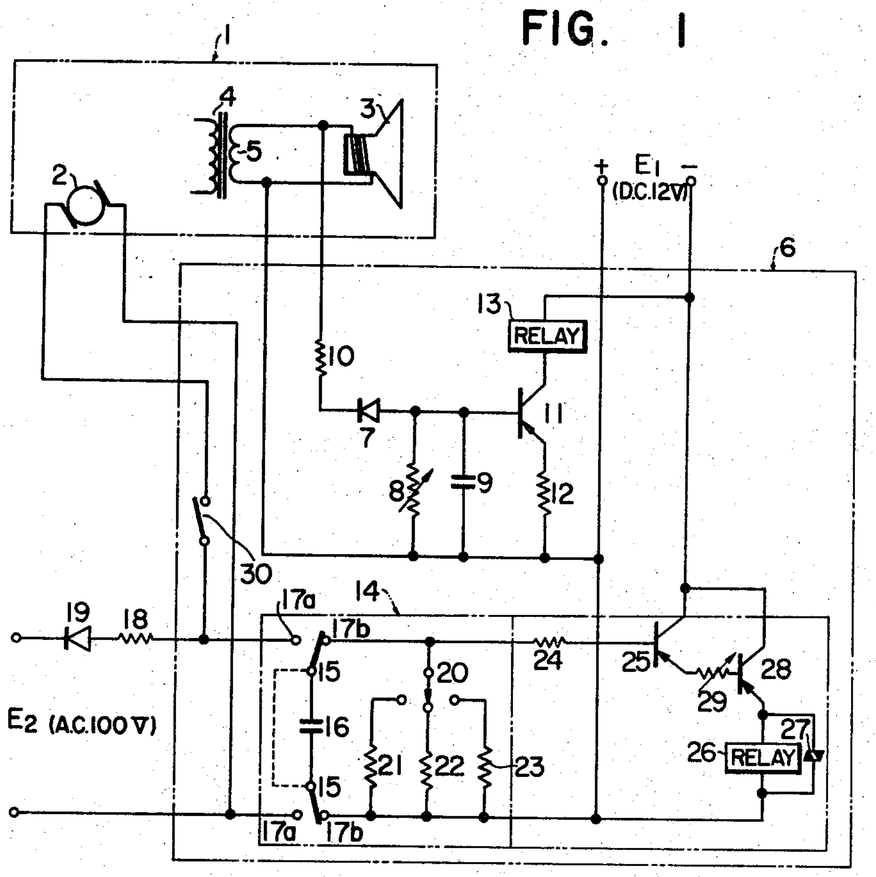
FIG. 1 is a circuit diagram of one of the embodiments of the present invention.
Figure 3A:
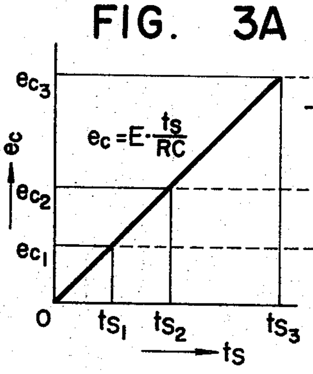
Figure 3B:
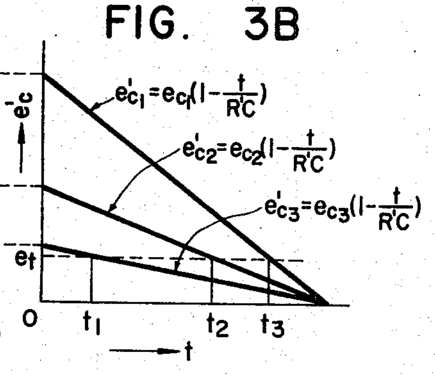
Figure 4:
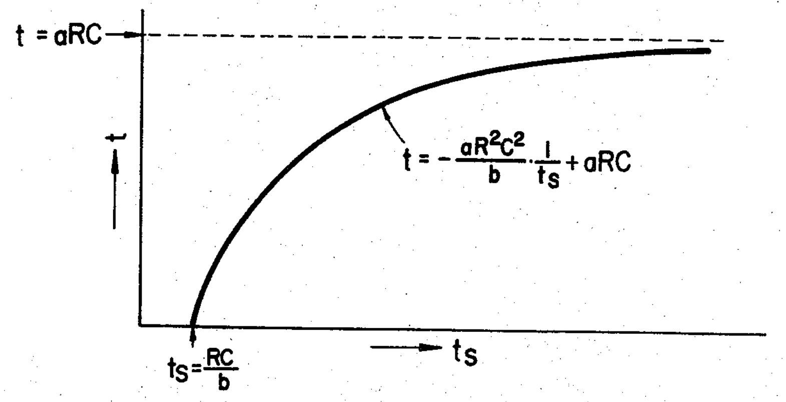
Figure 5:
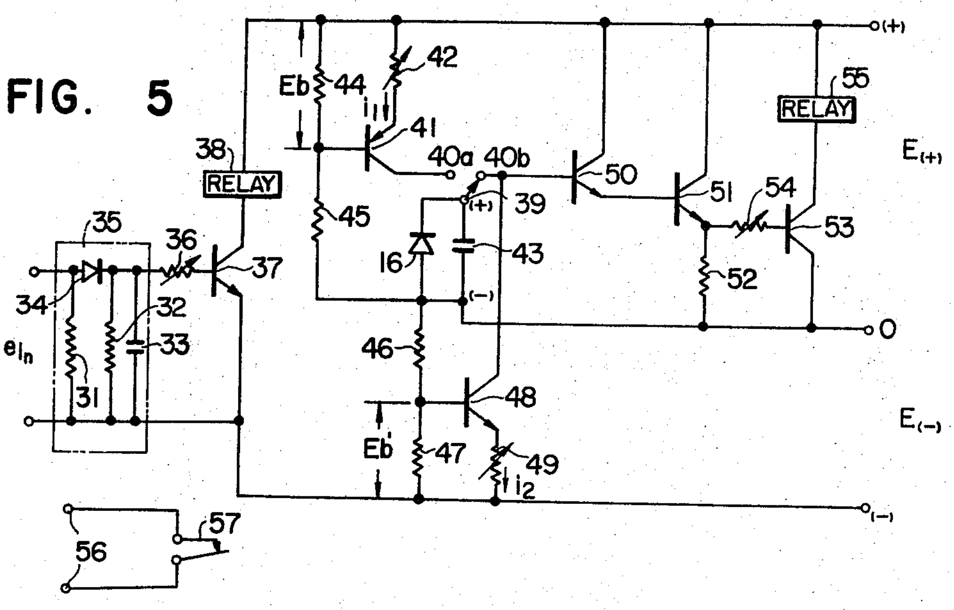
Figure 6:
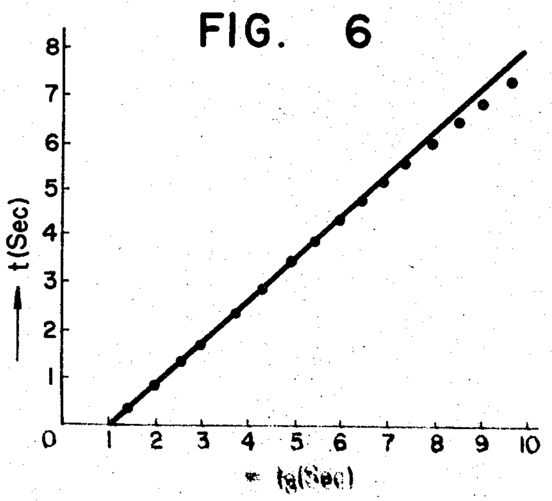
Figure 7:
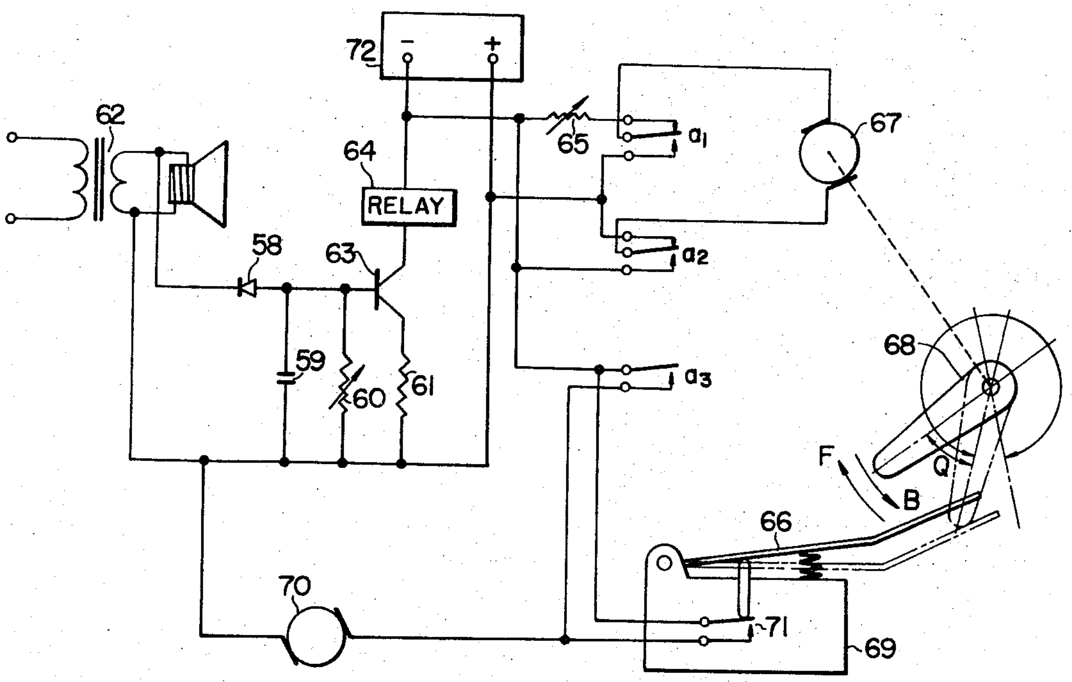
Figures 8A, 8B:
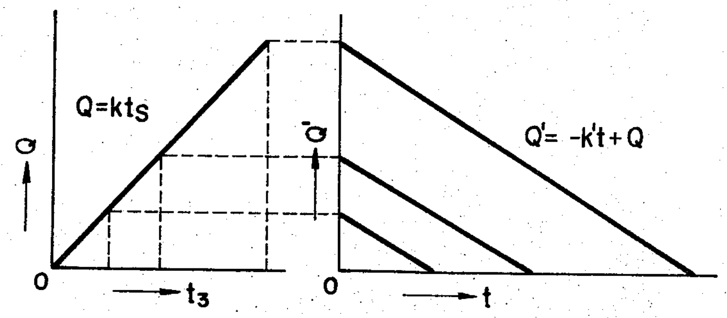

FIGS. 3(A) and 3(B) are explanatory graphical representations showing characteristic curves of one of the essential elements of the circuit of FIG. 1 for explaining the operation thereof;

FIG. 4 is a graphical representation showing the relation between the signal periods of a sequence of reproduced signals and the halted period by the circuit of FIG. 1;

FIG. 5 is a circuit diagram of another one of the embodiments of the present invention;

FIG. 6 is a graphical representation showing the relationship between the signal period of a sequence of reproduced signals and the halted period by the circuit of FIG. 5;

FIG. 7 is a circuit diagram of still another one of the embodiments of the present invention; and FIGS. 8(A) and 8(B) are explanatory graphical representations showing characteristic curves of one essential element of the circuit of FIG. 7 for explaining the operation thereof.

Referring now to FIGS. 1 through 4 inclusive, one of the preferred embodiments of the present invention will be described below.

In FIG. 1, a conventionally known signal reproducer 1 is illustrated and it is, in this case, represented by a magnetic tape player. Such a tape player conventionally includes a magnetic tape propelling mechanism, a magnetic head for operatingly picking up and converting a magnetically recorded signal into an electric signal, and an electric acoustic system having an amplifier and a speaker coupled to the amplifier for operatingly reproducing the recorded signal as an acoustic signal. For explanatory purposes, however, only certain essential elements of such a system, such as a magnetic tape propelling D.C. motor 2, a speaker 3, and an output transformer 4 of the electric acoustic system, which has an output secondary winding 5, are shown in the drawing.

A control device 6 according to the present invention, comprises a rectifier 7, a variable resistor 8, and a resistor 10, which are coupled in series across the secondary winding 5 of the output transformer 4; a capacitor 9 coupled in parallel to the variable resistor 8 for providing thereacross a rectified voltage corresponding to the signal appearing across the secondary winding 5; a PNP type transistor 11, the base electrode of which is connected to one end of the capacitor 9 and the emitter electrode of which is connected through an emitter resistor 12 to the positive terminal of a D.C. voltage source $E_1$ and also to the other one end of the capacitor 9; and a relay 13 connected between the collector electrode of the transistor 11 and the negative terminal of the D.C. voltage source $E_1$.

The relay 13 has a pair of stationary contacts $\mathbf{17}_a$, another pair of stationary contacts $\mathbf{17}_b$ and a pair of movable contacts 15 which operatingly contact the pair of stationary contacts $\mathbf{17}_a$ while the relay 13 is operative, otherwise they contact the pair of stationary contacts $\mathbf{17}_b$.

The control device 6 further comprises a capacitor 16 connected between the pair of movable contacts 15; different resistors 21, 22 and 23; a selector 20 for selectively connecting one of the resistors 21 through 23 between the pair of stationary contacts $\mathbf{17}_b$ of the relay 13; a PNP type transistor 25, the collector electrode of which is connected to the negative terminal of the D.C. voltage source $E_1$ and the base electrode of which is connected through a base resistor 24 to one contact of the pair of stationary contacts $\mathbf{17}_b$ of the relay 13; another PNP type transistor 28, the collector electrode of which is connected to the collector electrode of the transistor 25, the base electrode of which is connected through a variable resistor 29 to the emitter electrode of the transistor 25 and the emitter electrode of which is connected through a relay 26 to the positive terminal of the D.C. voltage source $E_1$ and also to the other one of the pair of stationary contacts $\mathbf{17}_b$ of the relay 13; and a varistor 27 coupled in parallel to the relay 26. The relay 26 has a switch contact 30 which opens while the relay 26 is operative, and is otherwise closed.

A resistor 18 and a rectifier 19 connected in series form an A.C. rectifying circuit for obtaining a D.C. voltage by rectification of an A.C. voltage $E_2$, such as 100 volts A.C. The thus obtained D.C. voltage is supplied to the pair of stationary contacts $\mathbf{17}_a$ and also to the D.C. motor 2 of the tape player 1 through the switch contact 30 of the relay 26. The varistor 27 serves as protection means for protecting the transistor 28 from a counter electromotive force induced by the relay 26.

In operation, when control of a signal reproducer by the control device according to the present invention is commenced but no audio signal appears across the secondary winding 5 of the output transformer 4, the relays 13 and 26 are maintained in their inoperative states so that the pair of movable contacts 15 of the relay 13 are in contact with the pair of stationary contacts $\mathbf{17}_b$, respectively, and the switch contact 30 of the relay 26 is in its closed state. By closure of the switch contact 30, the D.C. voltage obtained from the A.C. rectifying circuit is supplied to the D.C. motor 2 so that a recorded magnetic tape (not shown) is propelled to a magnetic head (not shown). In the course of advance of the magnetic tape, an audio signal is obtained across the secondary winding 5 of the transformer 4 which corresponds to the recorded signal from the magnetic tape.

Figure 2:
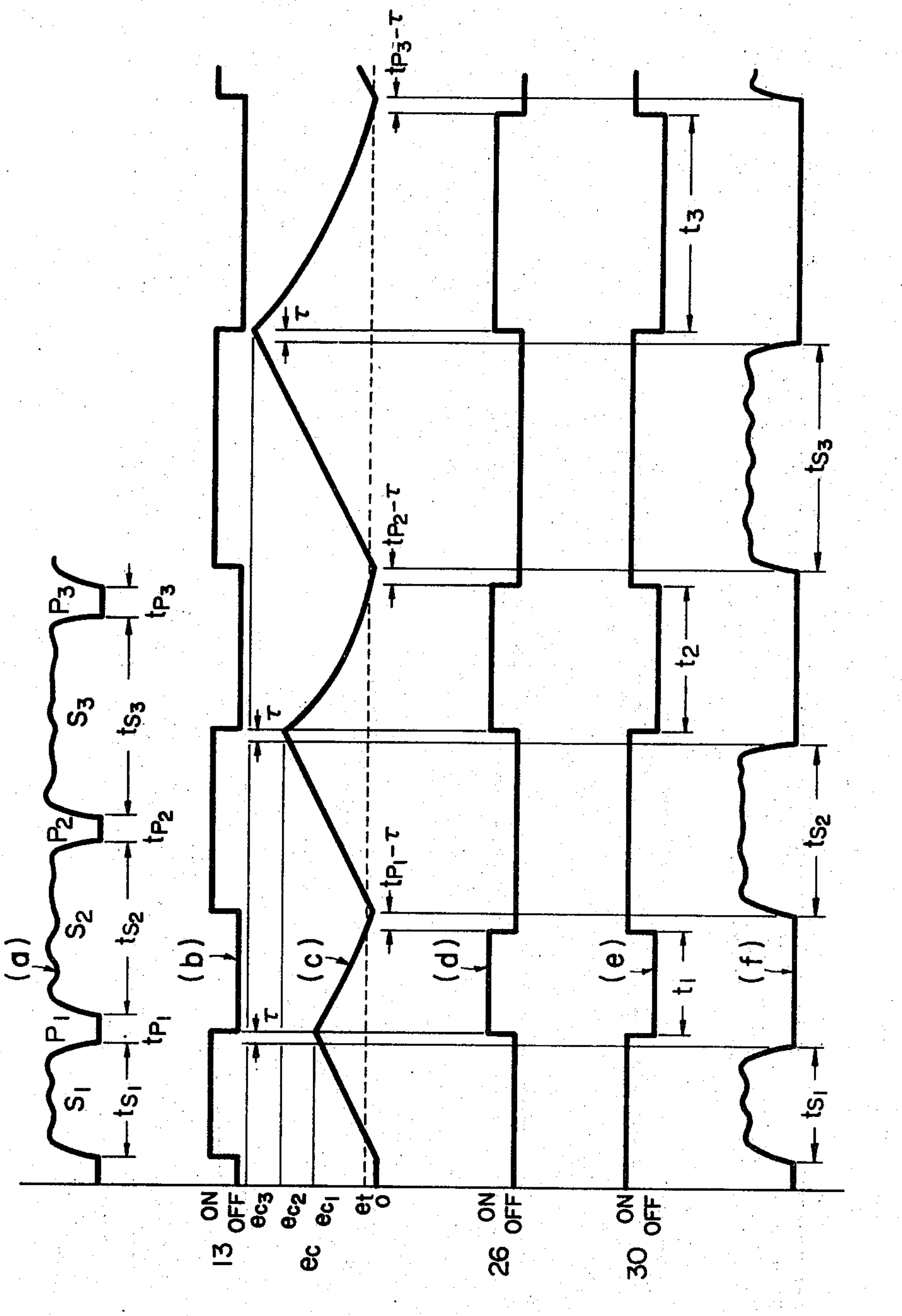
FIG. 2 is an explanatory graphical representation showing various characteristic curves of the essential elements in the circuit of FIG. 1 for explaining the relative operations thereof.

Assuming now that the signal content of the recorded signal is a lecture and the amplitude envelope of the audio signal corresponding to the lecturer's voice or speech sound is in the form (*a*) shown in FIG. 2, wherein $S_1$ $S_2$, . . . $S_n$ are respectively a group or a continuation of reproduced signals, $t_{s1}$, $t_s^2$, . . . $t_{sn}$, are the duration times thereof, $P_1$, $P_2$, . . . $P_n$ are pauses between the respective continuations of the reproduced signal due to breathing or phraseological needs, and $t_{p1}$, $t_{p2}$, . . . $t_{pn}$ are the duration times of the respective pauses.

Once the sequence $S_1$ of the reproduced signal appears across the secondary winding 5, it is rectified by the rectifier 7 into a corresponding rectified voltage and accumulated across the capacitor 9. This rectified voltage is impressed between the base and emitter electrodes of the transistor 11 to provide a foreward bias voltage thereon so that the transistor 11 is rendered operative to permit a large collector current to flow through the relay 13, resulting in shifting of the movable contacts 15 so as to be in contact with the pair of stationary contacts $\mathbf{17}_a$. From the moment when the contacts 15 and $\mathbf{17}_a$ contact each other, an electric charge may begin to flow into the capacitor 16 from the D.C. voltage of the A.C. rectifying circuit $E_2$, so that it is accumulated therein as time passes. The total amount of the accumulated electric charge will increase exponentially and the charging rate is determined by the values of the capacitor 16 and the resistor 18.

The voltage $e_e$ appearing across the capacitor 16 is expressed by the following equation:

$$e_c=E\left(1-\epsilon^{-\frac{t_s}{PC}}\right) \qquad (1)$$

wherein $t_s$ is the time during which the pair of movable contacts 15 are kept in contact with the pair of stationary contacts $\mathbf{17}_a$, R is the resistance of the resistor 18, C is the capacitance of the capacitor 16, $\epsilon$ is the base of natural logarithms, and E is the voltage applied across the capacitor 16. Where the resistor 18 and the capacitor 16 are so selected as to satisfy the condition $t_s \ll RC$, the voltage $e_c$ is approximated by the fololwing equation:

$$e_c=E\frac{t_s}{RC} \qquad (2)$$

The curve (*c*) of FIG. 2 and the curve of FIG. 3(A) show the voltage $e_c$ given by the above Equation (2).

Once the relay 13 has been rendered operative, such state may be maintained so long as the reproduced signal continues. As time passes, when the reproduced signal terminates, the voltage appearing across the capacitor 9 then rapidly decreases since the electric charge which is accumulated in the capacitor 9 is discharged through the variable resistor 8, thus the transistor 11 becomes inoperative and therefore the relay 13 is rendered inoperative. There may be a time delay $\tau$ between the moment of the termination of the reproduced signal and the moment when the relay 13 becomes inoperative because the relay 13 will be in inoperative condition after the termination of the reproduced signal until the decreasing collector current is reduced below the working current of the relay 13. This time delay $\tau$ is very important, for it allows the control device 6 to be non-responsive to breaks in the reproduced signal which are shorter than the time delay. It may be preferable to vary the time delay $\tau$ by empolying a variable element to vary the time constant determined by the resistor 8 and the capacitor 9.

When the relay 13 becomes inoperative, this causes the pair of movable contacts 15 thereof to contact with the pair of stationary contacts $\mathbf{17}_b$, so that the electric charge which has been accumulated in the capacitor 16 is discharge through the parallel coupled resistor 22. In this situation, the voltage $e_c'$ obtained across the capacitor 16 is given by the following equation:

$$e_c'=e_c\cdot\epsilon^{-\frac{t}{R'C}} \qquad (3)$$

where R' is the resistance of the resistor 22, and $t$ is the time which commenced at the moment when the pair of movable contacts 15 are switched to the pair of stational contacts $\mathbf{17}_b$. Where $t \ll R'C$, the voltage $e_c'$ will be approximated by the following equation:

$$e_c'=e_c\left(1-\frac{t}{R'C}\right) \qquad (4)$$

The curve (*c*) of FIG. 2 and the curve of FIG. 3(B) show the voltage $e_c'$ given by the above Equation (4).

On the other hand, when the pair of movable contacts 15 of the relay 13 are contacted by the pair of stationary contacts $\mathbf{17}_b$, a very small current may begin to flow into the base electrode of the transistor 25 through the resistor 24 as a result of the voltage $e_c'$ and is amplified by a common collector grounded circuit comprised by the transistors 25 and 28 in a cascade connection, so that the relay 26 is immediately actuated. The operation of the relay 26 will be understood from the curve *d* of FIG. 2. The switch contact 30 of the relay 26 is thus opened thereby stopping the tape propelling function of the D.C. motor 2. This will be understood from the curve *e* of FIG. 2.

The discharging rate of the electric charge from the capacitor 16 is controlled by the values of the capacitance of the capacitor 16 and of the resistance of the resistor 21, 22 or 23, coupled in parallel to the capacitor 16. Nevertheless, the voltage $e_c'$ decreases as a function of time $t$, when the voltage reaches below a predetermined workable voltage $e_t$, which is determined by the current amplification factor of the cascade connected transistors 25 and 28 and by the working current of the relay 26, then the relay 26 becomes inoperative, so that the contact 30 thereof is closed to actuate the motor 2 thereby propelling again the magnetic tape.

Accordingly, the signal reproducer is halted in its operation for a time during which the relay 26 is operative. Such operational relationship between the relays 13 and 26 and the capacitor 16 will be well understood from the curves $b$ through $e$ of FIG. 2.

If the period of one pause $P_1$ between the first sequence $S_1$ of the reproduced signal and the second sequence $S_2$ of the reproduced signal, i.e. $t_{p1}$, is longer than the above-mentioned delay time $\tau$, the remainder of the pause period, i.e., $t_{p1}-\tau$, may be prepositional before the following sequence $S_2$ of the recorded signal. Therefore, no signal period may be the sum of the halted period $t_1$ and the pause period $t_{p1}$.

In the control device 6, the elements 7 through 13 inclusive form a signal responsive circuit, namely, signal detecting means for operatingly detecting the commencement and termination of a sequence of the reproduced signal; the capacitor 16 associated with the pair of stationary contacts $17_a$ of the relay 13 and the A.C. rectifying circuit work as counting means for counting the signal period of a sequence of the reproduced signal; and the pair of stationary contacts $17_b$ of the relay 13 associated with the capacitor 16 therebetween, and the elements 20 through 29 inclusive which may be grouped into a circuit 14 as shown in FIG. 1, work as halting means for operatingly halting a signal reproducer only for a limited period of time corresponding to the counted result of the counting means.

The stop period $t$, the length of which is controlled by the circuit 14, is obtained from the Equation 4 by putting $e_c'=e_t$. That is, $$t=R'C\left(1-\frac{e_t}{e_c}\right) \qquad (5)$$

When $$e_t=\frac{1}{b}E$$

and $R'=aR$, then from the Equations 2 and 5, $t$ becomes, $$t=\frac{aR^2C^2}{b}\cdot\frac{1}{t_s}+aRC \qquad (6)$$

Therefore, the stop period $t$ progressively increases as the signal period increases. Consequently, it follows that the period of time for dictation can be varied according to the signal length to be dictated. According to the present embodiment, there is an advantage that the stop period can be suitably lengthened or shortened by only changing the values of the resistor and capacitor of the circuit 14 in accordance with speech speed or writer's ability.

Although the above-mentioned embodiment is advantageous in function, this circuit provides certain design difficulties. That is, the capacitance value of the capacitor 16 should be relatively large, i.e., of the order of from several tens to hundreds of microfarads, if a stop period of nearly ten seconds is to be obtained to satisfy the conditions of $t_s \ll R\cdot C$ and $t \ll R'\cdot C$ since the resistance values R and R' of the resistors 18 and 22 cannot be too large a value. Moreover, from the Equation 1 and the condition $t_s \ll R\cdot C$, the voltage E of the A.C. rectifying circuit should be $E \gg e_c$. On the other hand, however, $e_c$ should be relatively larger than $e_t$. And in practice, $e_t$ is required to be not smaller than several tens of volts to allow stable operation in the relay 26. Consequently, the voltage E should be of substantially high value, otherwise the control device will become less effective.

In order to overcome such difficulties, another embodiment will be described in connection with FIG. 5. In forming this embodiment a constant-current charging circuit and a constant-current discharging circuit are utilized in the circuit of FIG. 1. FIG. 5 shows the circuit diagram of the embodiment in which the same reference numerals designate the same elements as those of FIG. 1.

In the circuit of FIG. 5, a signal $e_{in}$ which corresponds to a sequence of reproduced signals S, is derived from the secondary winding 5 of the output transformer 4 of the signal reproducer 1, namely a tape player, in the well known manner as described in connection with FIG. 1. The signal $e_{in}$ is applied to a rectifying circuit 35 which comprises resistors 31 and 32, a capacitor 33 and a diode 34, where it is rectified. The rectified output voltage is then supplied to the base electrode of an NPN type transistor 37 through a variable resistor 36, so that a collector current flows through a relay 38 to actuate the same.

When the relay 38 is energized, the movable contact 39 of the relay 38 is connected to a stationary contact $40_a$ of the relay, so that a capacitor 43 is charged with a constant-current from a PNP type transistor 41 arranged in such a manner that the ground side of the capacitor 43 forms the lower potential side of the combination. The transistor 41 is adequately biased by resistors 42, 44 and 45.

The charging current $i$ is approximately given by the following equation:

$$i=\frac{E_b}{R_e} \qquad (7)$$

where $R_e$ is the resistance of resistor 42. After a period of time $t_s$ has passed, voltage may be obtained across the capacitor 43 by accumulation of electric charge according to the constant-current $i$, which is shown as follows:

$$C\cdot e_c=\int idt=i\cdot t_s$$

where C is a capacitance value of the capacitor 43.

Therefore, $e_c$ becomes:

$$e_c=\frac{E_b}{R_eC}\cdot t_s \qquad (8)$$

where $R_e$ is the resistance of the resistor 42 and $E_b$ is the base voltage of the transistor 41 as shown in FIG. 5.

When the signal $e_{in}$ terminates, the accumulated electric charge in the capacitor 33 is decreased by discharge through the resistor 32, the discharging rate thereof being determined by a time constant of the resistor 32 and the capacitor 33, so that the collector current of the transistor 37 will be rendered inoperative. When the collector current flowing through the relay 38 drops below the working current of the relay 38, the contact 39 switches into the contact $40_b$. In such a situation, the capacitor 43 is supplied with an opposite constant-current from a transistor of NPN type 48, so that the accumulated electric charge in the capacitor 43 will be decreased according to the following equation:

$$e_c'=e_c-\frac{E_b'}{R_e'C}t \qquad (9)$$

where $e_c'$ is the decreasing voltage across the capacitor 43 and $t$ is the time which begins at the moment when the contact 39 switches into the contact $40_b$; $R_e$ is the resistance of the resistor 49 and $E_b'$ is the base voltage of the transistor 48, as shown in FIG. 5. As apparent, this voltage $e_c'$ drops as time $t$ passes. Furthermore, when the contact 39 comes into contact with the contact $40_b$, the base potential of the transistor 50 rises so that the current amplification circuit comprised by the transistors 50 and 51 in Darlington connection will be actuated, and another transistor 53 will be driven through an emitter resistor 52 connected to the emitter electrode of the transistor 50 and the base resistor 54 of the transistor 53. Therefore, current may flow through another relay 55 inserted in the collector circuit of the transistor 53.

When the relay 55 is energized, a pair of switch contacts 57 of the relay 55 are opened so that a tape propelling motor may be de-energized.

Since the voltage $e_c'$ obtained across the capacitor 43 decreases at a constant rate due to the opposite constant-current from the transistor 48, the base-to-emitter potential of the transistor 50 decreases, and when this potential drops to a value below a predetermined value $e_t$, the transistor 50 would be rendered in its nonconductive state, so that no electric current flows into the relay 55 thereby closing once again the switch contact 57. And as the tape is driven, the transistor 37 will be rendered conductive in response to appearance of a reproduced signal across the capacitor 33 resulting in switching of the contact 39 into the contact $\mathbf{40_a}$. Thus, the above-described cyclic operation is repeated.

In this circuit configuration, the relation between signal period $t_s$ and stop period $t$ is given by the following equation:

$$t=\frac{E_bR_e'}{E_b'R_e}\left(t_s-\frac{R_eC}{E_b}\cdot e_t\right) \qquad (10)$$

Diode D in the circuit of FIG. 5 is provided to prevent the voltage $e_c'$ from dropping below zero, and the resistors 46, 47 and 49 are included to provide adequate bias voltages on the transistor 48.

FIG. 6 shows the test-measured results of the signal stop period $t$ against the signal period $t_s$. It is clearly observed that the relation therebetween is substantially linear. As shown by the Equation (10) the stop time $t$ may be varied by suitably selecting the emitter resistors 42 and 47, the capacitor 43 and the voltages $E_b$ and $E_b'$ applied to the bases of the transistors 41 and 48.

The abovedescribed embodiment sufficiently meets with the conditions of $t_s \ll R\cdot C$ and $t \ll R'\cdot C$ by the constant-current charging and discharging circuits comprises respectively by the transistors 41 and 48.

As a substitution for the electrical circuits of the previous embodiments, a mechanical arrangement may be also employed, as seen in FIG. 7. In this embodiment a movable member, such as a rotatable cam, constitutes its essential element, the rotation angle of which corresponds to the signal period of a sequence of the reproduced signal and the recover rotating time of which controls the stop period.

Referring now to FIG. 7, the reference numeral 58 designates a diode connected in series with a capacitor 59 across the secondary of transformer 62, and a pair of bias resistors 60 and 61 are connected to the base and emitter electrodes, respectively, of a transistor 63. These elements are so arranged and disposed as to compose a means by which the recorded and stop intervals in the signal to be reproduced by the recorder and derived from an output transformer 62 of the recorder can be electrically detected. The reference numeral 64 designates a relay; $a_1$, $a_2$ and $a_3$, designate the contacts of the relay 64 respectively; and 67 designates a D.C. motor which operatingly rotates in two opposite directions and whose direction of rotation is controlled by said contacts $a_1$ and $a_2$. The rotary speed of the motor can be suitably varied by means of a variable resistor 65. The reference numeral 68 designates a cam which is rotated by means of the motor 67 and actuates a lever 66 of a microswitch 69 so as to move the lever upwardly or downwardly, whereby a contact 71 is caused to open or close in order to control a motor 70 for driving a recorded body or medium in a signal reproducer (not shown). The reference numeral 72 designates a power source for the motors 67 and 70.

The operation of this embodiment of the invention will be described initially for the condition when no output signal is received from the recorder. In this case, the transistor 63 is in the non-conductive state so that no current flows through the relay 64. Therefore, the upper contacts of the relay contacts $a_1$ and $a_2$ are closed so that the D.C. motor 67 is rotated in the direction B. In this case, the rotary speed of the motor can be adjusted by means of the resistor 65. According to the rotation of the motor, the cam 68 is pushed down and it pushes down the lever 16 of the microswitch 69. Such rotation of the motor is stopped at the position indicated by the dotted line by any suitable initial cam position indicator (not shown). Consequently, through the contact 71 of the microswitch 69 is closed, whereas the relay contact $a_3$ is opened, the current flows into the motor 70 by way of the microswitch contact 71 for driving the signal reproducer such as a tape recorder, so that the recorded body, such as recorded tape or the like is moved past the transcribing head. When the recorded body is driven and the portion thereof where the aural signal is recorded reaches the head, the aural signal is reproduced in the output winding of the output transformer 62 of the recorder. This aural signal is rectified by means of the diode 58 and is applied to the base of the transistor 63 through a low-pass filter circuit comprising the capacitor 59 and the resistor 60. Then, the current flows through the collector circuit of the transistor 13 so that the relay 64 is actuated.

When the current flows through the relay 64, $a_1$ and $a_2$ are kept in contact with their lower fixed contacts respectively. At the same time $a_3$ is also closed so that the driving current for the motor is switched thereby rotating the cam 68 in the direction indicated by the arrow F. Consequently, the contact of the microswitch 69 is opened, but since the relay contact $a_3$ connected in parallel is kept closed, the current is permitted to flow into the motor 70 for driving the recorder so that the recording body is continuously driven.

Now let it be assumed that there exists an interval or a silent pause in the recorded aural signal when no signal voltage is derived for some time from the output winding of the output transformer 62 of the recorder. When this interval exceeds a predetermined short time determined by the charging time capacitor 59 and the resistor 60, then the base potential of the transistor 63 becomes zero so that the transistor 63 is rendered nonconductive. In this case, there flows no collector current so that the relay is returned to its initial or original condition.

In this case, when the relay contacts $a_1$ and $a_2$ are in contact with the upper contacts respectively, the D.C. motor 67 is driven in reverse direction thereby rotating the cam 68 in the direction indicated by the arrow B. At this time, the relay contact $a_3$ is made to open so that electric current is cut off. Thus the motor 70 for driving the recorder stops driving the recording body. When the cam 68 is further rotated in the direction indicated by the arrow B and comes to rest at the stop or rest position indicated by the dotted line, then the microswitch 69 closes its contact so that the current is supplied again into the motor 70 for driving the recorder to thereby drive the recording body again.

As described hereinbefore, the cam 68 is positioned at its initial position, indicated by the dotted line, when there is no recorded signal, is caused to rotate in the direction indicated by the arrow F only during the time when recorded signal is received and is returned again to its initial or rest position, indicated by the dotted line. That is, the recorder stops driving only during the time when the cam 68 is being reversed. By the suitable provision of the reduction gear or stopper, the rotary speed of the cam 68 may be set in such a manner that the cam shown in FIG. 7 rotates through its maximum angle of rotation for a time of the order of 10 sec.

Now let it be assumed that the angle of rotation measured from the origin, that is the stop or rest position of the cam 68 is Q. Then, the relation between the recording interval or period $t_s$ and Q may be expressed by the following expression:

$$Q=k \cdot t_s \quad (11)$$

where $k$ is the rotary speed of the cam 18 which is assumed to have a fixed value.

Next, when the cam 68 is reversed in the direction indicated by the arrow B during the time of stop interval through the angle of Q through which the cam 68 has been rotated in the direction indicated by the arrow F during the previous recording interval, then the cam 18 can be returned to its stop or rest position. In this case, the following equation holds:

$$Q'=-k't+Q \quad (12)$$

where $t$ is the time measured from the instant when the cam 68 begins to rotate in the direction indicated by the arrow F, Q′ is the angle between the rest position and the position of the cam 68 at time $t$, and $k$ is the angular velocity in this rotation. The time $t$ required for satisfying the conduction of $Q'=O$, is the time when the recording body is not driving.
Therefore, from Equation (12).

$$t=\frac{k}{k'}t_s \quad (13)$$

Thus the object of the present invention that the stop interval during the time of reproduction of the recording body can be arbitrarily and automatically lengthened in response to the recorded interval prior to said stop interval can be accomplished.

As described in detail in the foregoing, according to the present invention, it employs a mechanical time measuring mechanism which is adapted to measure the time by a rotation angle of a cam and which is as a whole extremely simple in construction and in which it is simple to set the maximum signal time $t_s$ and the stop time $t$ in the order of nearly ten seconds. Also the time thus set may easily be varied, so that the stop period can be suitably adjusted depending on the writing speed of the operator.

Furthermore, since the control device of the present case employs mechanical means, only a suitable battery or D.C. voltage source for actuating the electric circuit is needed, thus permiting the present device to be adapted to a small-sized battery type tape player or the like. As described above, therefore, the present invention has remarkably practical effects.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are encompassed by the scope of the appended claims.

We claim:

1. Apparatus for controlling a signal reproducer operatingly reproducing a sequence of signals of varying duration comprising a power supply selectively connected to said signal reproducer for effecting operation thereof, timing means selectively connected to said power supply for storing the time period of each continuous period of the signals reproduced by said signal reproducer, control means responsive to said timing means for disconnecting said power supply from signal reproducer for a period of time proportional to the last time period stored by said timing means, and detecting means for detecting the signals generated by said signal reproducer, said detecting means selectively connecting said timing means to said control means when a pause is detected in the signal at the output of said signal reproducer so as to disconnect said power supply from said signal reproducer.

2. The combination defined in claim 1 wherein said timing means is a capacitor selectively connectable to said power supply and said control means.

3. The combination defined in claim 2 wherein said detecting means includes first relay means actuated in response to detection of a signal from said signal reproducer for connecting said capacitor to said power supply, said first relay normally connecting said capacitor to said control means in the non-actuated condition thereof.

4. The combination defined in claim 3 wherein said control means includes a discharge circuit for said capacitor and second relay means responsive to a charge on said capacitor for disconnecting said power supply from said signal reproducer for the time during which said capacitor discharges to a predetermined value.

5. The combination defined in claim 1 wherein said timing means includes a first transistor amplifier of a first conductivity type selectively connected in series with a capacitor to said power supply.

6. The combination defined in claim 5 wherein said detecting means includes first relay means actuated in response to detection of a signal from said signal reproducer for switching the connection of said capacitor from said control means to said first transistor amplifier.

7. The combination defined in claim 6 wherein said control means includes a discharge circuit for said capacitor having a second transistor amplifier of a second conductivity type and second relay means responsive to the discharging current of said capacitor for disconnecting said power supply from said signal reproducer for the time during which said capacitor discharges to a predetermined value.

8. The combination defined in claim 1 wherein said timing means includes cam means selectively rotatable in first and second directions at a controlled speed.

9. The combination defined in claim 8 wherein said control means includes a switch operated by said cam means upon rotation thereof to the extreme of its first direction to connect said power supply to said signal reproducer.

10. The combination defined in claim 9 wherein said detecting means includes relay control means for driving said cam means in said second direction upon actuation thereof by said signal from said signal reproducer and for driving said cam means in said first direction in the non-actuated condition thereof.

11. The combination defined in claim 10 wherein said relay control means includes further switch means for connecting said power supply to said signal reproducer only upon actuation of said relay control means.

12. Apparatus for controlling the operation of a signal reproducer which operatingly reproduces a sequence of signals with intermitant pauses comprising:

detecting means responsive to the output of said signal reproducer for detecting the presence of each continuation of signals reproduced in the output of said signal reproducer;

counting means selectively actuated by said detecting means for the extent of the time period during which said detecting means detects each said continuation of signals for operatively counting the length of duration of each said signal continuation detected; and halting means selectively rendered operative in response to the detection by said detecting means of the termination of the presence of each said signal continuation for a limited time period, the length of which is proportional to that of the last duration of said signal continuation counted by said counting means, for operatively halting the signal reproducing operation of said signal reproducer as long as said halting means is operative, thereby providing an artificial pause of the duration of said limited time period in the silent pause reproduced after each said signal continuation periods.

13. Apparatus according to claim 12, wherein said counting means includes first timer means for operatively generating an output the amount of which is variable in proportion to the length of its operative period and wherein said halting means includes second timer means for operatively resetting the output from said first timer means in response to the detection by said detecting means of the termination of the presence of each said signal continuation and control means responsive to said second timer means for operatively halting the operation of said signal reproducer for a limited time period until the output of said first timer means reaches a predetermined value whereby the halting period of said control means becomes proportional to the value of the output of said first timer means.

14. Apparatus according to claim 13, wherein said first timer means includes a capacitor and a current source; wherein said detecting means includes a rectifying circuit operatingly rectifying the signals reproduced in the output of said signal reproducer for generating an output voltage representative of the presence of each signal continuation and first relay means actuated by the output voltage of said rectifying circuit for selectively connecting said capacitor to said power supply while it is in the actuated condition thereof so that a charge is accumulated on said capacitor from said current source; wherein said second timer means includes a discharging circuit connected to said capacitor while said first relay means is in its non-actuated condition so that the charge on said capacitor discharges through said discharging circuit; and wherein said control means includes second relay means actuated by said discharging charge from said capacitor until it reaches a predetermined minimum workable value of said second relay means.

15. Apparatus according to claim 14, wherein said current source is a constant-current source and said discharging circuit is a constant-current discharging circuit.

16. Apparatus according to claim 13, wherein the rate of the resetting operation of said second timer means is variable so that the length of the halting period of said control means is varied.

17. Apparatus according to claim 14, wherein said charging and discharging circuits have a time constant, respectively, at least one of which is variable so that the length of said halting period of said control means is varied.

18. Apparatus according to claim 14, wherein said rectifying circuit has a variable time constant so that such signal continuations with a shorter pause therebetween than said time constant may be combined.

19. Apparatus according to claim 13, wherein said first timer means includes rotatable cam means and first drive means for operatingly rotating said rotatable cam means in a first direction at a controlled constant speed; wherein said detecting means includes a rectifying circuit for operatingly rectifying the signals reproduced in the output of said signal reproducer for generating an output voltage representative of the presence of each said signal continuation and first relay means actuated by the output voltage of said rectifying circuit for selectively actuating said first drive means while said first relay means is in its actuated condition so that said cam means is rotated in said first direction at an angle of rotation which is proportional to the length of the actuated period of said first relay means; wherein said second timer means includes second driving means selectively actuated while said first relay means is in its non-actuated condition for operatingly rotating said rotatable means in a second direction opposite to said first direction at a controlled constant speed; and wherein said control means includes second relay means actuated in response to the termination of the actuated period of said first relay means and retained in its actuated condition while said cam means returns to a predetermined position of rotation, whereby said signal reproducer is halted in its signal reproducing operation for the extent of the actuated period of said second relay means.

20. Apparatus according to claim 19, wherein the controlled constant speeds of rotation of said rotatable cam means controlled by said first and second drive means are different from each other.

21. Apparatus according to claim 20, wherein at least one of said first and second drive means further includes speed control means for controlling the rotation of said rotatable cam means.

22. Apparatus for controlling a signal reproducer operatingly reproducing a sequence of signals of varying durations each followed by a silent pause comprising:

a power supply selectively connected to said signal reproducer for effecting operation thereof;

detecting means for detecting the presence of each continuation of the signals reproduced by said signal reproducer;

counting means selectively actuated by said detecting means for the extent of the time period during which said detecting means detects the signals in the output of said signal reproducer for storing the time period of each said signal continuation detected by said detecting means; and halting means responsive to said counting means for disconnecting said power supply from said signal reproducer, said halting means being so controlled by said counting means that its disconnection operation is commenced at the time when the actuation of said counting means is ceased and that its disconnection operation is maintained for the extent of a limited time period whose length is determined in proportion to the last time period stored by said counting means, whereby said halting means selectively renders said signal reproducer inoperative in response to every detection by said detecting means of the silent pauses reproduced in the output of said signal reproducer.

23. The combination defined in claim 22, wherein said detecting means includes first relay means selectively actuated in response to presence of a signal continuation reproduced in the output of said signal reproducer and wherein said counting means includes a capacitor, said first relay means selectively connecting said capacitor to said power supply while it is in the actuated condition thereof so that the charge on said capacitor is discharged through said halting means, respectively.

24. The combination defined in claim 23, wherein said halting means includes a discharge circuit selectively connected to said capacitor and second relay means responsive to a charge on said capacitor for disconnecting said power supply from said signal reproducer for the time period until the charge on said capacitor reaches a predetermined minimum workable value of said second relay means.

25. The combination defined in claim 22, wherein said detecting means includes first relay means selectively actuated in response to detection by said detecting means of the presence of a signal continuation reproduced in the output of said signal reproducer, and wherein said counting means includes a capacitor and a constant-current source, said first relay means selectively connecting said capacitor to said constant-current source while it is in the actuated condition thereof so that a charge is accumulated on said capacitor and connecting to said halting means while it is in the non-actuated condition thereof so that the charge on said capacitor discharges through said halting means, respectively.

26. The combination defined in claim 25, wherein said halting means includes a constant-current discharge circuit selectively connected to said capacitor and second relay means responsive to the charge on said capacitor for disconnecting said power supply from said signal reproducer for the time period until the charge on said capacitor reaches a predetermined minimum workable value of said second relay means.

27. The combination defined in claim 22, wherein said counting means includes rotatable cam means and first drive means responsive to said detecting means for operatingly connecting said rotatable cam means to said power supply in a first manner so that said rotatable cam means is rotated in a first direction at a controlled speed; wherein said halting means includes second drive means responsive to said detecting means for operatively connecting said rotatable cam means to said power supply in a second manner opposite to said first manner attained by said first drive means so that said rotatable cam means is rotated in a second direction opposite to said first direction at a controlled speed and control switch means actuated in response to the detection of the termination of the presence of said signal continuation by said detecting means and retained in its actuated condition by said rotatable cam means until it returns to a predetermined position upon its rotation in the second direction for operatively disconnecting said power supply from said signal reproducer; and wherein said detecting means includes relay means selectively rendered operative in response to the detection by the detecting means of the presence of the signal continuation for operatively actuating said first and second drive means, respectively, while the relay means is in its operative and inoperative conditions.

28. Apparatus for controlling the operation of a signal reproducer which operatingly reproduces an alternate sequence of signals and silent pauses comprising:

detecting means adapted to said signal reproducer, said detecting means being rendered operative in response to the commencement of each continuation of the reproduced signals and rendered inoperative in response to the termination of each continuation of said signals reproduced in the output of said signal reproducer, so that the duration of said signal continuation is represented by the operative period thereof;

counting means selectively rendered operative in synchronism with the operative period of said detecting means for operatively counting the length of duration of the operative period of said detecting means; and halting means adapted to said signal reproducer and selectively rendered operative in response to the commencement of the inoperative period of said detecting means for a limited time period, the length of which is determined to be in proportion to that of the last duration of the operative period of the detecting means counted by said counting means so as to operatively halt the signal reproducing operation of said signal reproducer.

whereby providing an artificial pause of duration of said limited time period into the silent pause reproduced after said signal continuation.

29. Apparatus for controlling a signal reproducer operatingly reproducing a sequence of alternation of signals and silent pauses comprising:

detecting means adapted to said signal reproducer, said detecting means operatingly detecting the presence of each continuation of the signals reproduced in the output of said signal reproducer and generating an output signal representative of detection of the presence of said signal continuation;

counting means responsive to the output signal from said detecting means, said counting means being selectively rendered operative for the extent of the time period during which the output signal is generated by said detecting means so that said counting means operatively counts the length of duration of said output signal; and halting means selectively rendered operative in response to the termination of the output signal from said detecting means and maintained operative by said counting means for a limited time period, the length of which is determined in proportion to that of duration of the last operative period of said counting means, for operatively halting the signal reproducing operation of the signal reproducer for said limited time period, whereby providing an artificial pause of duration of said limited time period after reproduction of said signal.

References Cited

UNITED STATES PATENTS

| | | | |
|---|---|---|---|
| 3,402,226 | 9/1968 | Winther ---------- | 179—100.1 |
| 3,011,030 | 12/1961 | Langendorf -------- | 179—100.1 |

FOREIGN PATENTS

| | | |
|---|---|---|
| 249,961 | 3/1964 | Australia. |

TERRELL W. FEARS, Primary Examiner

J. ROSENBLATT, Assistant Examiner

U.S. Cl. X.R.

179—100.2